(12) United States Patent
Vu et al.

(10) Patent No.: US 11,941,349 B1
(45) Date of Patent: Mar. 26, 2024

(54) HANDWRITTEN TEXT LINE WRAPPING

(71) Applicant: Lenovo (Singapore) Pte. Ltd., Singapore (SG)

(72) Inventors: Tran Minh Khuong Vu, Kanagawa (JP); Ryohta Nomura, Kanagawa (JP)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/942,531

(22) Filed: Sep. 12, 2022

(51) Int. Cl.
*G06F 17/00* (2019.01)
*G06F 40/166* (2020.01)
*G06V 30/244* (2022.01)
*G06V 30/414* (2022.01)

(52) U.S. Cl.
CPC ........ *G06F 40/166* (2020.01); *G06V 30/2455* (2022.01); *G06V 30/414* (2022.01)

(58) Field of Classification Search
CPC . G06F 40/166; G06V 30/2455; G06V 30/414
See application file for complete search history.

(56) References Cited

U.S. PATENT DOCUMENTS 7,454,063 B1 * 11/2008 Kneisl ............... G06V 30/2272
382/229
2016/0154579 A1 * 6/2016 Lee ..................... G06F 3/04883
382/189
2021/0133476 A1 * 5/2021 Goodman ............. G06F 18/214
2021/0374190 A1 * 12/2021 Shepherd ............... G06N 3/045
2022/0301244 A1 * 9/2022 Kumawat ............. G06T 11/203

OTHER PUBLICATIONS

Procházka, Štěpán. "Adaptive Handwritten Text Recognition." (2021) (Year: 2021).*
Song, Zhiyi, et al. "Linguistic Resources for Handwriting Recognition and Translation Evaluation." LREC. 2012 (Year: 2012).*

* cited by examiner

*Primary Examiner* — Andrew T McIntosh
(74) *Attorney, Agent, or Firm* — Osha Bergman Watanabe & Burton LLP (57) ABSTRACT

A computer-implemented method for handwritten text line wrapping includes: obtaining, from a user, at least two words of handwritten text on a screen; determining an original bounding box for the at least two words; creating at least one line-break character for the at least two words; determining at least one baseline for the at least two words; determining a new bounding box for the at least two words based on the at least one baseline; generating, on the screen, a text box; moving, on the screen, at least one of the at least two words from a first line of at least one line of handwritten text to a second line of the at least one line of handwritten text, wherein the second line of handwritten text fits within the text box; and adjusting at least one gap between the at least one line of handwritten text.

20 Claims, 9 Drawing Sheets

HANDWRITTEN TEXT LINE WRAPPING

BACKGROUND

Typed contents can be edited flexibly with text line wrapping. However, this is a challenge for handwritten text because of its variation in sizes and base line alignment of words. Current technology allows for text line wrapping for predefined text sizes and a single base line; a method is needed to process handwritten text consistently, regardless of variations in sizes and base lines.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, one or more embodiments relate to a computer-implemented method for handwritten text line wrapping, comprising: obtaining, from a user, at least two words of handwritten text on a screen; determining an original bounding box for the at least two words of handwritten text; creating at least one line-break character for the at least two words of handwritten text; determining at least one baseline for the at least two words of handwritten text; determining a new bounding box for the at least two words of handwritten text based on the at least one baseline, wherein the new bounding box makes the handwritten text have a same height; generating, on the screen, a text box; moving, on the screen, at least one of the at least two words of handwritten text from a first line of at least one line of handwritten text to a second line of the at least one line of handwritten text, wherein the second line of handwritten text fits within the text box; and adjusting at least one gap between the at least one line of handwritten text.

In general, one or more embodiments relate to a non-transitory computer readable medium storing instructions executable by a computer processor, the instructions comprising functionality for: obtaining, from a user, at least two words of handwritten text on a screen; determining an original bounding box for the at least two words of handwritten text; creating at least one line-break character for the at least two words of handwritten text; determining at least one baseline for the at least two words of handwritten text; determining a new bounding box for the at least two words of handwritten text based on the at least one baseline; generating, on the screen, a text box; moving, on the screen, at least one of the at least two words of handwritten text from a first line of at least one line of handwritten text to a second line of the at least one line of handwritten text; and adjusting at least one gap between the at least one line of handwritten text.

In general, one or more embodiments relate to a system comprising functionality for handwritten text line wrapping, comprising: a screen configured to receive input from a user and display the input to the user; and a computer processor, configured to: obtain, from the user, at least two words of handwritten text on the screen, determine an original bounding box for the at least two words of handwritten text, create at least one line-break character for the at least two words of handwritten text; determine at least one baseline for the at least two words of handwritten text, determine a new bounding box for the at least two words of handwritten text based on the at least one baseline, move, on the screen, at least one of the at least two words of handwritten text from a first line of at least one line of handwritten text to a second line of the at least one line of handwritten text, and adjust at least one gap between the at least one line of handwritten text.

Other aspects and advantages of the claimed subject matter will be apparent from the following description and the appended claims.

BRIEF DESCRIPTION OF DRAWINGS

Specific embodiments of the disclosed technology will now be described in detail with reference to the accompanying figures. Like elements in the various figures are denoted by like reference numerals for consistency.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

In the following description of FIGS. 1-9, any component described regarding a figure, in various embodiments disclosed herein, may be equivalent to one or more like-named components described with regard to any other figure. For brevity, descriptions of these components will not be repeated regarding each figure. Thus, each and every embodiment of the components of each figure is incorporated by reference and assumed to be optionally present within every other figure having one or more like-named components. Additionally, in accordance with various embodiments disclosed herein, any description of the components of a figure is to be interpreted as an optional embodiment which may be implemented in addition to, in conjunction with, or in place of the embodiments described with regard to a corresponding like-named component in any other figure.

It is to be understood that the singular forms "a," "an," and "the" include plural referents unless the context clearly dictates otherwise. Thus, for example, reference to "an autonomous sensor" includes reference to one or more of such autonomous sensors.

Terms such as "approximately," "substantially," etc., mean that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide. It is to be understood that one or more of the steps shown in the flowcharts may be omitted, repeated, and/or performed in a different order than the order shown. Accordingly, the scope disclosed herein should not be considered limited to the specific arrangement of steps shown in the flowcharts.

In general, a method in accordance with one or more embodiments allows a user to wrap lines of handwritten text on a computer screen upon the creation of a text box by a user. The method further allows the user to adjust the size of the text box with a gesture. When adjusted in the horizontal direction on a screen, the lines of handwritten text are further wrapped according to the adjusted dimensions of the text box. When adjusted in the vertical direction on a screen, spacing between lines of text is adjusted accordingly. When wrapped, preexisting explicit line breaks are preserved in the wrapped handwritten text.

Using embodiments disclosed herein, a computer is able to handle text line wrapping with any arbitrary size of handwriting properly. The user can enjoy writing with free sized text.

Figure 1:
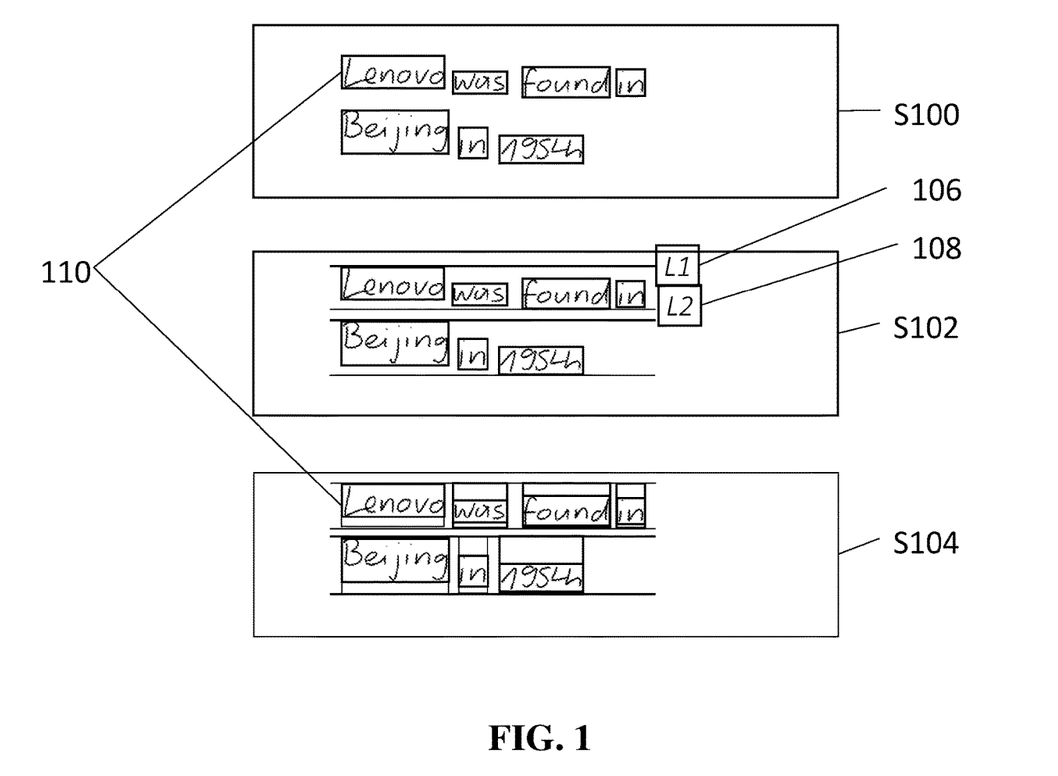
FIG. 1 depicts the process of constructing and modifying bounding boxes around handwritten text according to one or more embodiments.

FIG. 1 presents a step-by-step depiction of the invention according to one or more embodiments. FIG. 1 shows Screens (S100), (S102), and (S104) as displayed on a touch screen of a computing device. Each screen (S100, S102, S104) is configured to receiving input from a user, such as for example, handwritten text input onto the touchscreen by a user. In Screen (S100), handwritten text "Lenovo was found in Beijing in 1984" is displayed. The computer creates bounding boxes (110) around each word in the sentence corresponding to furthest limits of the word in the horizontal and vertical directions on the screen. Screen (S102) shows a determination of the highest and lowest points in the first line of handwritten text is performed by finding the highest vertical point for all the words on that line, denoted L1 (106), and the lowest vertical point of all the words on that line, denoted L2 (108). In Screen (S104), the bounding box (110) of each word on the line is extended to have L1 (106) and L2 (108) as its upper and lower limits, respectively. The lower limit of a line of handwritten text is its baseline.

More specifically, there are N lines of handwritten text: Line[1], Line[2], . . . , Line[N], where each line, Line[i], consists of words Word[i,j] whose bounding boxes (110) are denoted as $Rect_{ij}(x_{ij}, y_{ij}, W_{ij}, H_{ij})$, where $W_{ij}$ is the width of the bounding box (110) and $H_{ij}$ is the height of the bounding box (110) for a particular word, Word[i,j]. For the purpose of all figures presented herein, the x coordinate increases to the right of the screen and the y coordinate increases towards the bottom of the screen. Once L1 (106) and L2 are found for all of the handwritten words, the bounding boxes are updated for all of the words so that the height of the bounding boxes for each word is the same.

Figure 2:
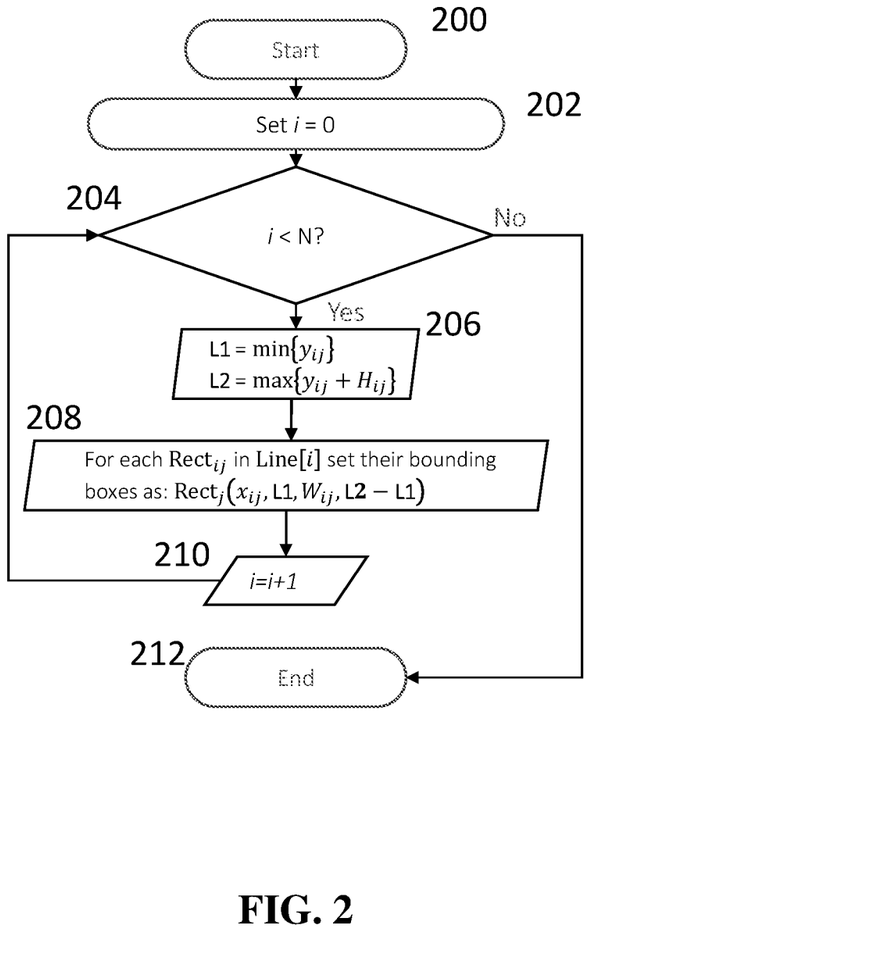
FIG. 2 shows the flowchart of the method for constructing and modifying bounding boxes around handwritten text according to one or more embodiments.

FIG. 2 shows a flowchart of the method depicted in FIG. 1 according to one or more embodiments. In Step 200 the algorithm begins. In Step 202, a counter, i, corresponding to the text line, is initialized to 0. In Step 204, the computer checks whether i<N. If i=N, the loop is exited (Step 212); else it proceeds to Step 206. In Step 206, a search is performed over all the words, Word[i,j], on each line, Line[i], of handwritten text for a minimum value of $y_{ij}$ (the top vertical coordinate of the bounding box (110) of Word [i,j]). L1 (106) is set to be this minimum value. Similarly, a search is conducted over all words on Line [i] for the maximum value of $y_{ij}+H_{ij}$ (the bottom vertical coordinate of all the words in Line[i]). L2 (108) is set to be this maximum value. In Step 208, a new bounding box (110) is defined for all the words in Line[i] as $Rect_{ij}=Rect_{ij}(x_{ij}, L1, W_{ij}, L2-L1)$. In Step 210, the counter i is increased by 1. Step 204 is then repeated until the conditional test is failed and the loop terminates. The method of FIG. 2 allows words in a same line have a same height.

Figure 3:
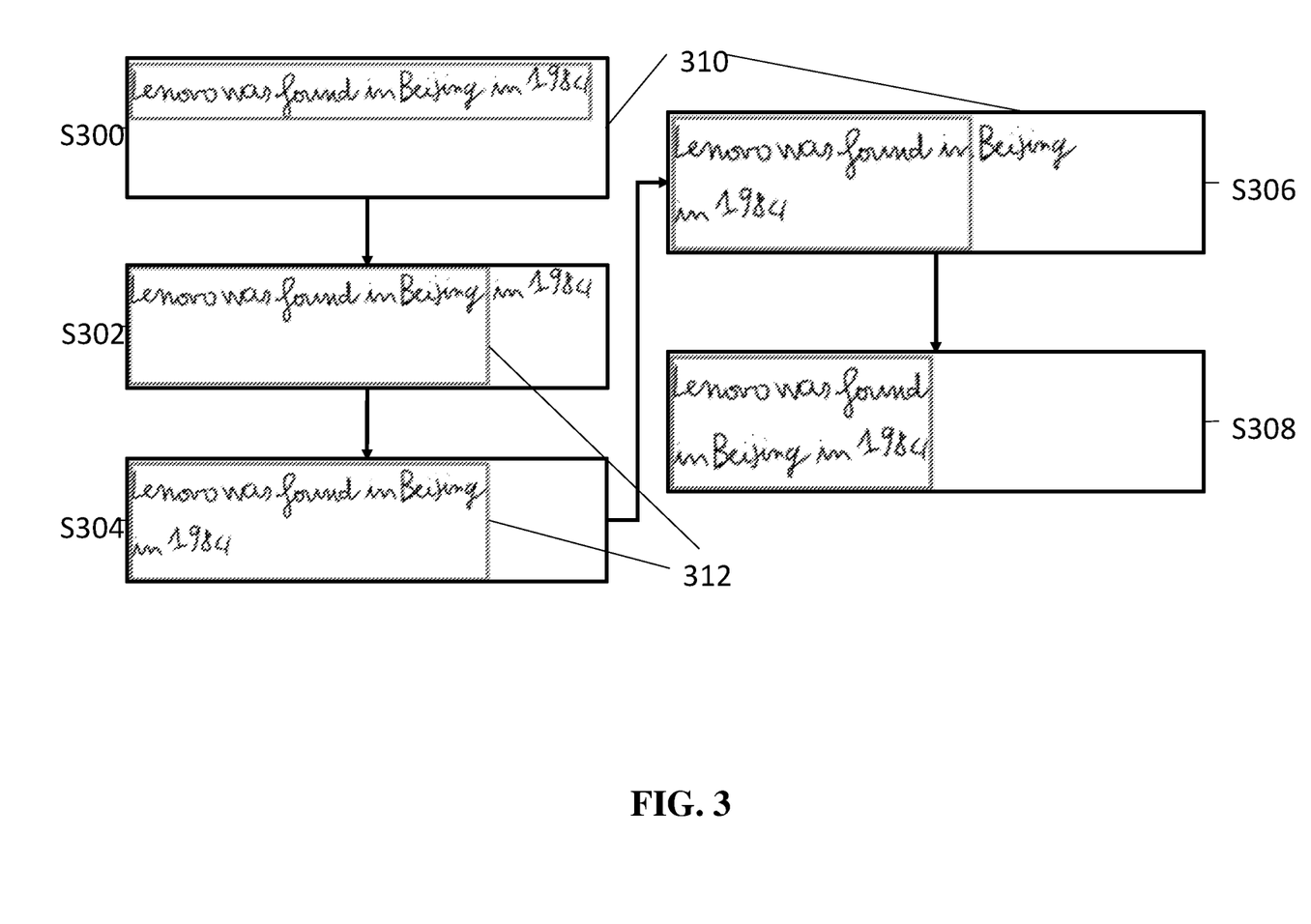
FIG. 3 depicts the handwritten text line wrapping method according to one or more embodiments.

FIG. 3 presents one example of a step-by-step depiction of the handwritten text line wrapping method according to one or more embodiments. FIG. 3 shows Screens (S300)-(S308) as displayed sequentially on a touch screen of a computing device. The outer box (310) represents the limits of the computer screen, the inner box represents a user-generated text box (312). In Screen (S300), the text box (312) encapsulates an entire line of handwritten text. In Screen (S302), the user resizes the text box (312), decreasing its width. In Screen (S304), the method of this invention moves the handwritten text that lies outside the text box (312) ("in 1984") to a new line below the first line of handwritten text. In Screen (S306), the user further adjusts the size of the text box (312), decreasing its width. This leaves the text "Beijing" outside the text box (312). The word "in" also intersects the new text box (312). In Screen (S308), the method of this invention moves the words "in Beijing" to the second line of handwritten text, inserting them before the words "in 1984", which are moved to create space.

Figure 4:
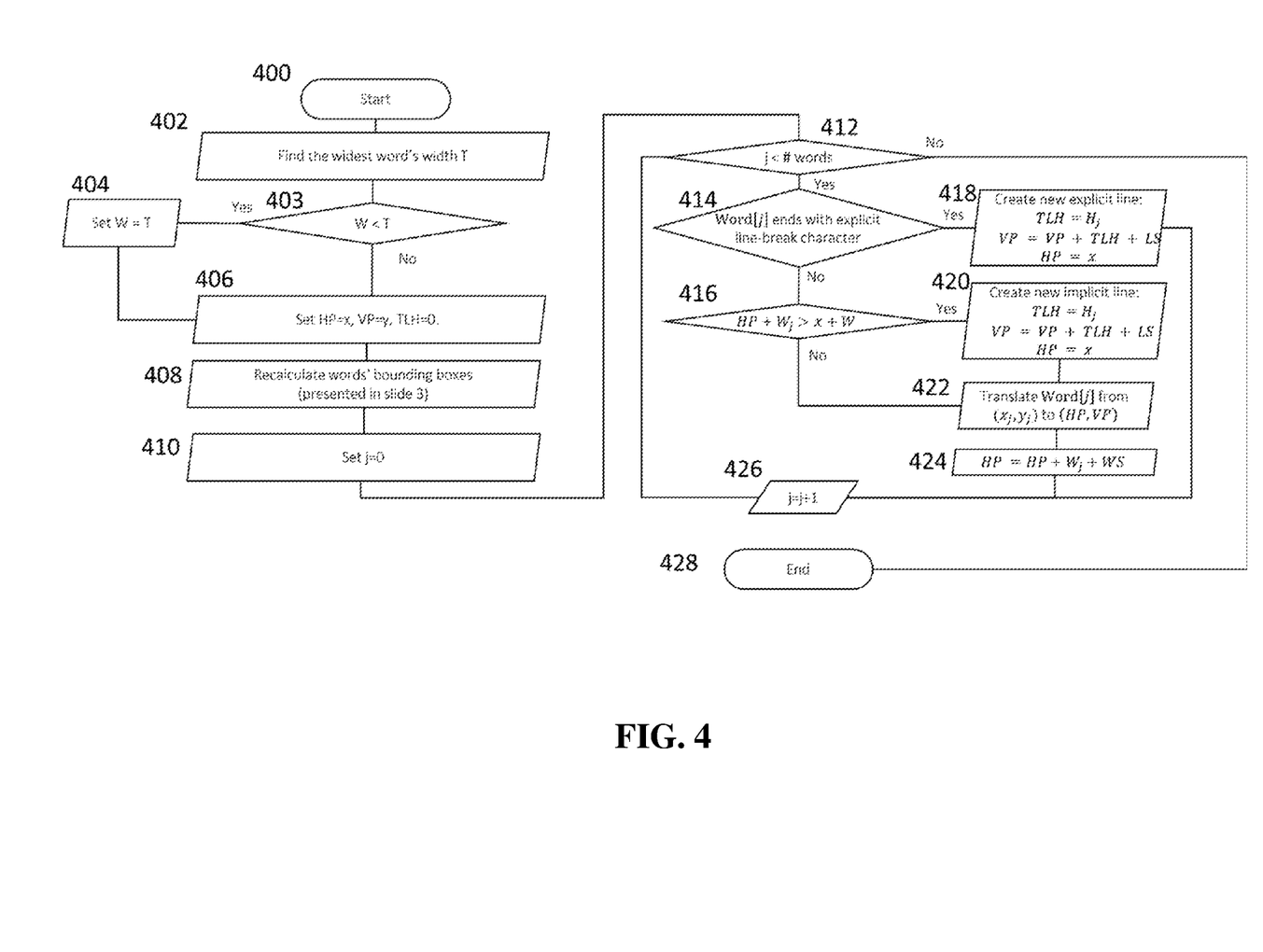
FIG. 4 shows a flowchart of the method for handwritten text line wrapping according to one or more embodiments.

FIG. 4 shows a flowchart of the invention depicted in FIG. 3 according to one or more embodiments. More specifically, FIG. 4 details the steps of the method for wrapping handwritten text from one line onto another when a text box (312) with on-screen coordinates x, y, and dimensions W (width) and H (height), is created around the handwritten text by a user. Previous to the start of the method, bounding boxes (110), $Rect_j(x_j, y_j, W_j, H_j)$, have been created around all the words of handwritten text according to the flowchart in FIG. 2. In this case, the bounding boxes (110) have been re-indexed over the words; the algorithm for handwritten text line wrapping does not require information regarding which line a word of handwritten text is located on. The method does, however, register and keep track of where end-of-line breaks exist in the original handwritten text, and preserves them throughout the line wrapping process.

In Step 400, the algorithm is initiated by the creation of the new text box (312) around the existing handwritten text by the user. In Step 402, all of the words of handwritten text are examined to find the one with the largest width, T. In Step 403, it is determined whether T is greater than W, the width of the text box (312). If it is, the flowchart proceeds to Step 404, and the width of the text box is set equal to T. This ensures that the text box (312) is wide enough to support the widest word, should it be isolated on a line by itself. The method then proceeds to Step 406. Alternatively, if T is less than or equal to W, Step 403 proceeds immediately to Step 406. In Step 406, variables related to a horizontal position (HP), a vertical position (VP), and a text line height (TLH) are initialized as follow: HP=x, VP=y, and TLH=0. These three variables keep track of the location of the location of the word of handwritten text currently being processed. In Step 410, a counter j is initialized to 0.

In Step 412, the main loop of the algorithm begins and the computer checks whether j is less than the total number of words. If not, there are no more words to process and the method proceeds to Step 428, where it stops. If j is less than the total number of words, the method proceeds to Step 414, where the computer determines if Word[j] is followed by an explicit line-breaking character. An explicit line break is a character where a user intended to end a line and make a new text line below it. The explicit line-breaking character is maintained in computer memory, and denotes a location on the screen where the user explicitly ended one line of text and started a new one below it. The explicit line-breaking character allows all subsequent line-wrapping of the handwritten text to honor the location of the new line of text. Conversely, an implicit line break denotes the location of a new line created by the computer during the process of line wrapping; the implicit line break occurs when there is no room left on an existing line of text when resized by a text box (312) and text exceeding the boundary of the text box (312) must be pushed to the next line.

If Word[j] is followed by an explicit line-breaking character, the method proceeds to Step 418, and creates a new line of handwritten text. In this case, the text line height is set to the height of Word [j] (TLH=$H_j$), and the vertical position variable is set to the following value: VP=VP+TLH+LS, where LS is a line spacing variable set previously to a default value by developers or the user. In other words, the vertical position is updated and shifted by the total line height plus the line spacing variable. The horizontal position variable is set to the following value: HP=x, which sends it back to the beginning of the next line on the screen. Step 418 is proceeded by Step 426, which increments the counter, j=j+1, and then returns to Step 412.

If, in Step 414, Word[j] was not followed by an explicit line-breaking character, the method proceeds to Step 416, and the computer determines whether the horizontal position (HP), when added to the width of the word, $W_j$, is greater than x added to W, i.e., when HP+$W_j$>x+W. Since x is the horizontal coordinate of the text box (312), and W is the width of the text box (312), this inequality is checking whether the current word, Word[j], is exceeding the boundary of the text box (312). If it is, the method proceeds to Step 420, which creates a new implicit line of text. The variables are updated as follows: TLH=$H_j$, VP=VP+TLH+LS, and HP=x. Since the horizontal position variable, HP, is reset to x, it has returned to the beginning of a line at the left side of the text box (312). The vertical position is increased by the text line height (TLH) added to the line spacing variable (LS); in other words, VP is now at a lower location on the screen and signifies the y coordinate of the words on the next line of handwritten text. Step 420 proceeds to Step 422, and translates Word[j] from its location at $x_j$, $y_j$ to HP, VP. If, in Step 416, the computer evaluation of HP+$W_j$>x+W failed (i.e., Word[j] did not exceed the boundary of the text box, 312), the method would proceed to Step 422, as well. In this case, the word being processed would be placed immediately after, and on the same line as the previous word. Step 422 subsequently proceeds to Step 424, and sets HP=HP+$W_j$+WS, where WS is a word spacing variable set previously to a default value by developers or the user. This moves the horizontal location in computer memory forward for the next word. Step 424 proceeds to Step 426, which increments the counter, j, and returns to Step 412.

Figure 5:
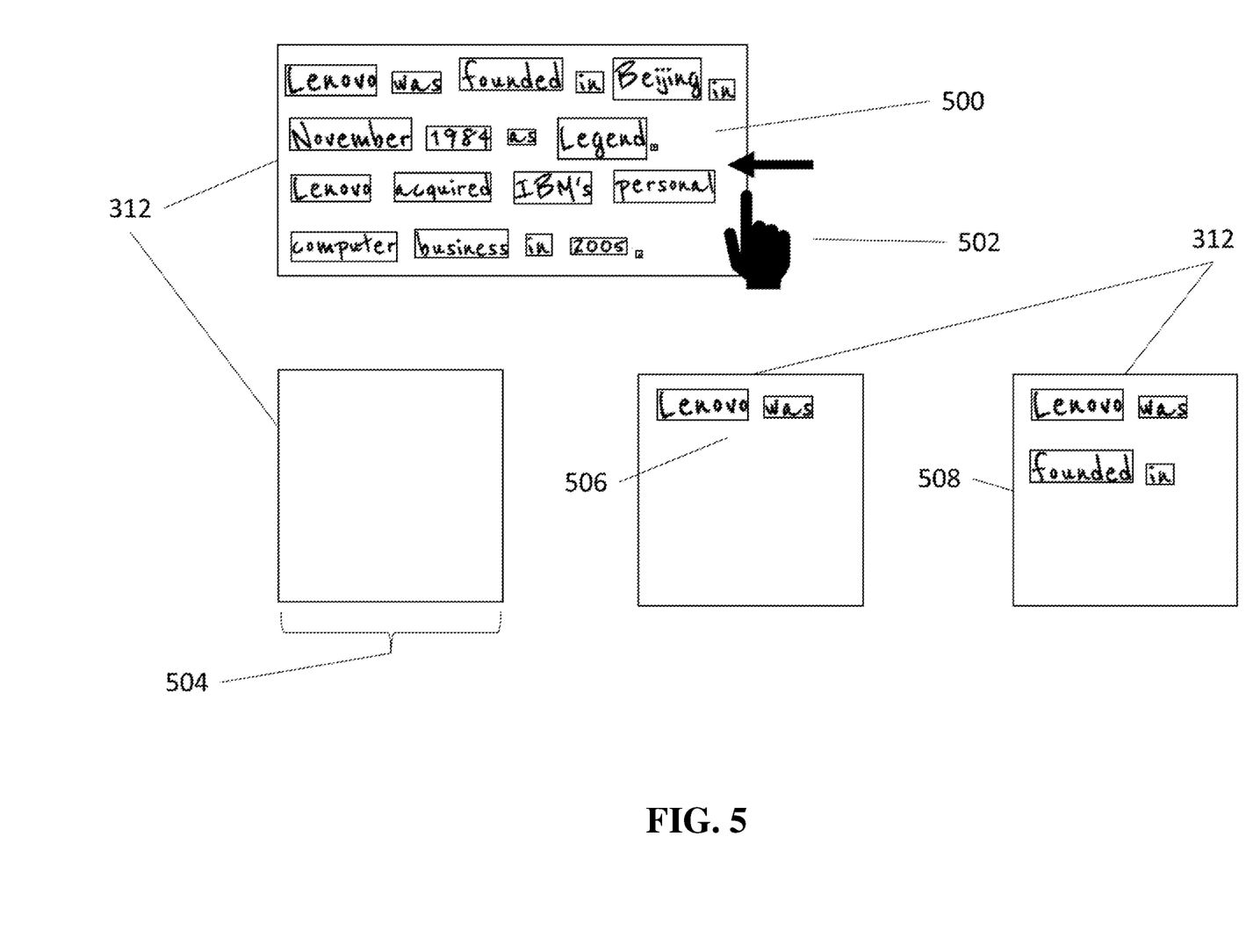
FIG. 5 depicts the process of a user modifying a text box in a horizontal direction on a screen and applying the handwritten text line wrapping method according to one or more embodiments.

FIG. 5 illustrates the operation of the method presented in the flowchart of FIG. 4 for the first three words of handwritten text in a block of text (500) entered on a screen by a user. In this embodiment, a text box (312) has been created around the text and the user resizes the text box (312) using a finger (502), producing a new text box (312) of smaller horizontal dimension (504). After initializing the values for variables HP, VP, TLH, and j in Steps 400 through 410 of FIG. 4, the method begins the loop over the number of words. The first two words of handwritten text, "Lenovo" and "was" (506), are left unchanged since they lie within the new text box (312). The third word, "founded", however, crosses the boundary of the new text box (312). The inequality in Step 416 of FIG. 4 is satisfied, and Step 420 creates an implicit new line of text. Following Steps 422 and 424, the computer then moves the word that exceeds the boundaries of the text box (312) to the next line. Step 424 proceeds to Step 426, then back to Step 412 to repeat the loop. The next time through the loop, the word "in", which also exceeded the boundary of the new text box (312), is moved to the next line after the word "founded" (508). In this way, all the words of text are processed, one word at time, during each iteration of the loop.

Figure 6:
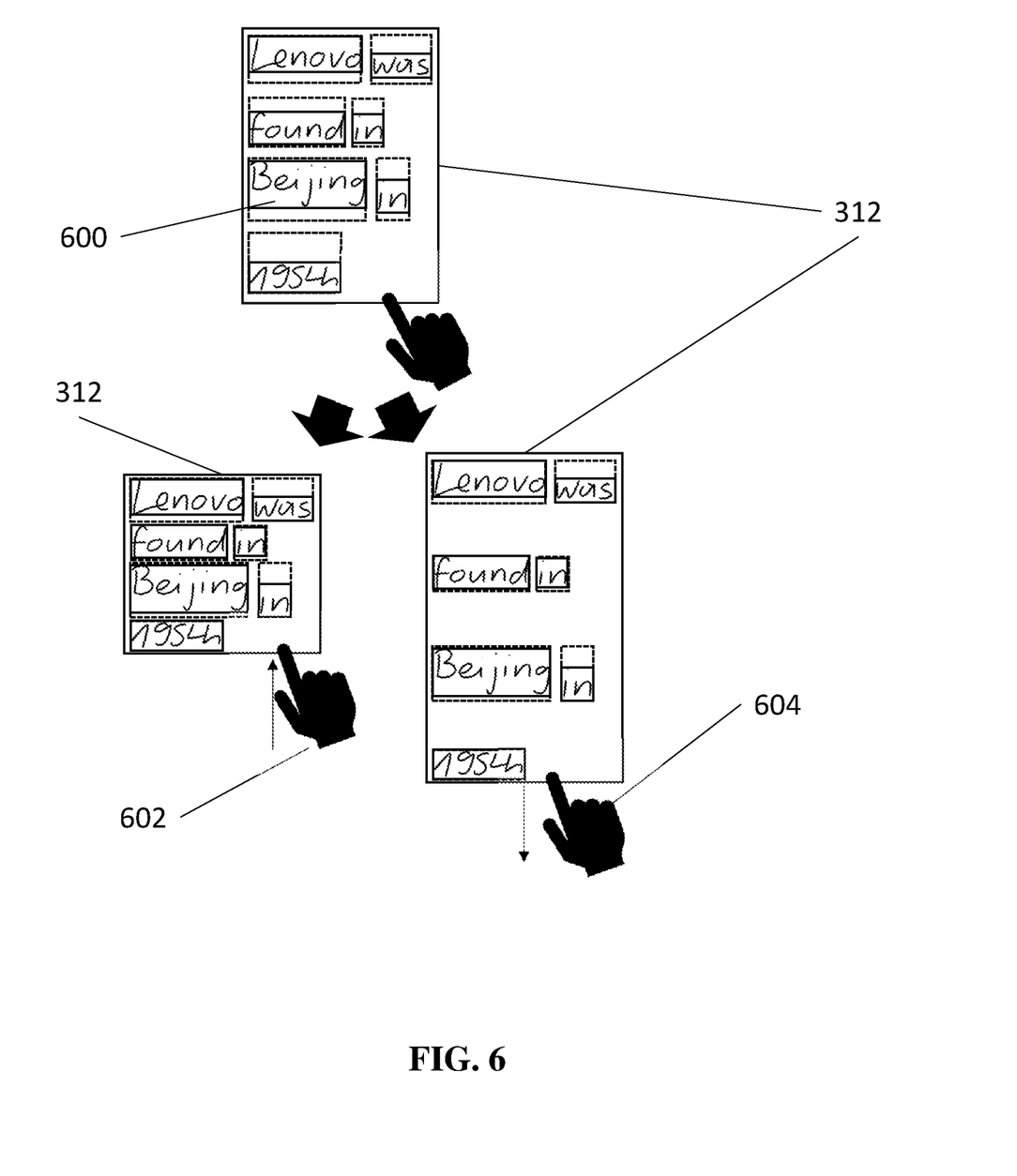
FIG. 6 depicts the process of a user modifying the vertical dimension of a text box on a screen with a gesture according to one or more embodiments.

FIG. 6 presents another feature of the invention. In one or more embodiments, the feature allows a text box (312) containing handwritten text to be stretched or squeezed in the vertical direction on the screen, with the spacing between lines of text adjusting accordingly. A text box (312) contains an example of handwritten text (600) stating "Lenovo was found in Beijing in 1984". As a first option, the same text box (312) is compressed in the vertical direction by the motion of a user's finger on a touch screen (602). As a second option, the same text box (312) is stretched in the opposite direction (604), causing the spaces between the lines of handwritten text to expand accordingly.

Figure 7:
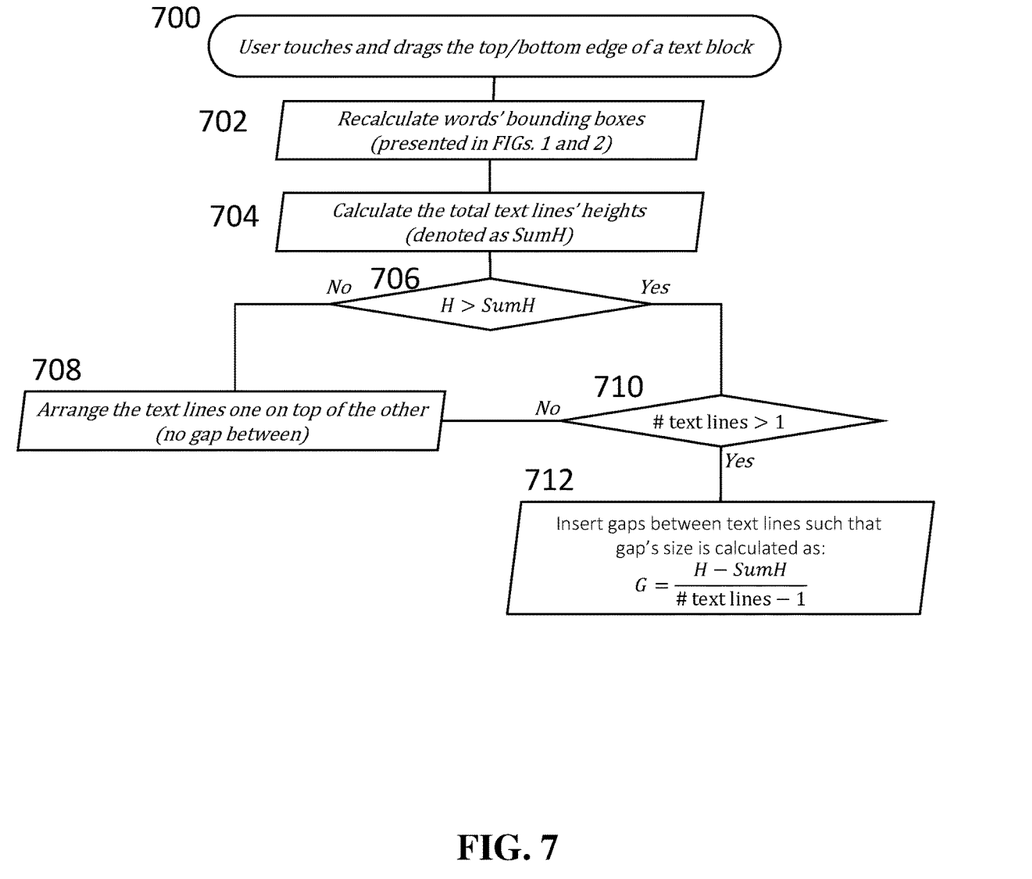
FIG. 7 shows a flowchart of the method for modifying the vertical dimension of the text box with a gesture according to one or more embodiments.

FIG. 7 shows a flowchart of the method depicted in FIG. 6 according to one or more embodiments. Specifically, FIG. 7 details the steps of the method for text line gap adjustment. In Step 700, the user touches and drags the bottom or top edge of a text block. This stretches or squeezes each line of handwritten text uniformly. If the box is stretched, the lines of handwritten text are maximally extended in the vertical direction of the text box (312). If the box is squeezed in the vertical direction, the interline spacing of the lines of handwritten text is diminished until the distance between lines reaches a minimum value of 0. In Step 702, the computer re-determines the bounding boxes (110) of all the words of handwritten text in the text block according to the method shown in FIGS. 1 and 2. In Step 704, the total height of all the lines of handwritten text, combined, is added together in variable called SumH. In Step 706, the computer determines whether H (i.e., the height of the text box (312) is less than or equal to SumH. In the case where H≤SumH, the lines of handwritten text will be placed one on top of the other with no separation between them (708).

In the case where H>SumH, the method proceeds to step 710. In step 710, the computer determines whether the number of the lines of text is greater than 1. If the number of lines of text is not greater than 1, then method proceeds to step 708, described above, such that the lines of handwritten text will be placed one on top of the other with no separation between them. In this case, since there is only one line (or zero lines) of text, this step results in normally displaying the single line of handwritten text. However, if the computer determines, in step 710, that the number of lines is greater than one, then the method proceeds to step 712. In step 712, interline gaps of a common gap length, G, are inserted according to the following equation:

$$G = \frac{H - \text{Sum}H}{(\text{\# of lines of text}) - 1}.$$

In this way, the size, G, of the interline gaps is determined as the difference between the height, H, of the text box and the total height of all of the lines of text, SumH, divided by one less than the number of lines of text. In other words, the leftover space in the text box (the amount by which the text box is larger in height than the sum of the heights of each line of text) is divided and allocated equally to the spaces separating each line of text.

Figure 8:
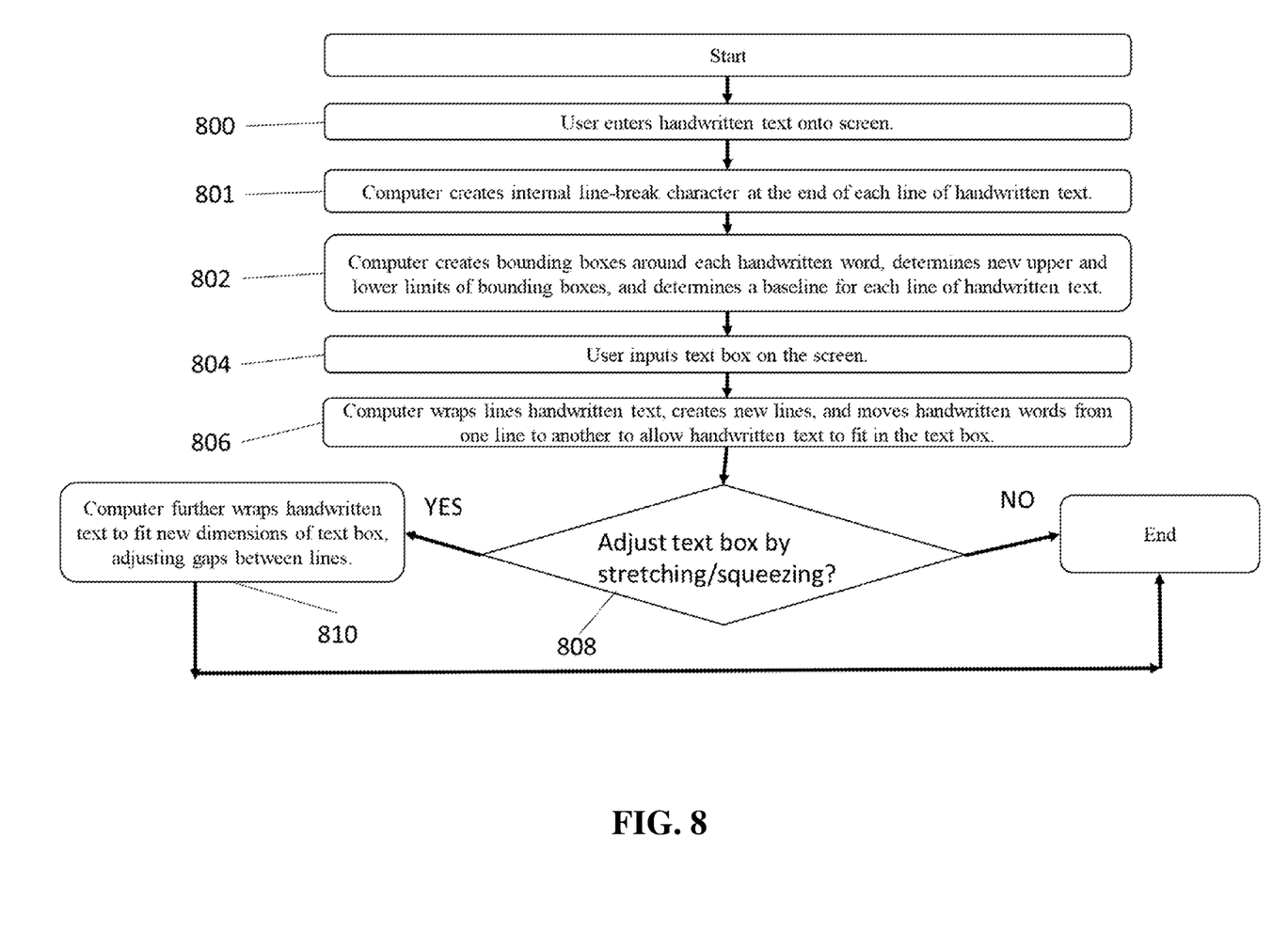
FIG. 8 shows a workflow of the method for handwritten text line wrapping according to one or more embodiments.

FIG. 8 presents the workflow of the invention in accordance with one or more embodiments. In Step 800, a user enters handwritten text on a screen using a finger, stylus, or any other suitable input device. In one or more embodiments, the stylus may be any manual writing instrument whose marks can be recorded on a touch screen. The text may be entered on a single line or on multiple lines. In Step 801, the computer creates an internal line-break character at the end of each line of handwritten text. In Step 802, the computer identifies and determines a bounding box (110) around each separate handwritten word. The computer then determines a new upper and lower vertical limit for each line of handwritten text. The vertical limits of the bounding box (110) for each word on a line is adjusted to the upper and lower limit for that particular line. The bottom limit for each line is also identified as the baseline for that line of text. In Step 804, the user creates or inputs a text box (312) on the screen. This may be done using a finger, stylus, or other device. However, in some embodiments, the computer may automatically generate the text box on the screen, such that the user is not required to actively create the text box. In Step 806, the computer (and more specifically, the processor of a computing device) wraps the lines of handwritten text to fit into the new text box (312). To do this, it creates new lines and moves words that exceed the width of the text box (312) onto lower lines. Lines ending with a line-break character remain free of handwritten text beyond the line-break character; any text that would follow the line-break character is moved the next line of text.

At this stage a decision is made as to whether the user wishes to stretch or squeeze (i.e., alter the dimensions of the text box) (Step 808), resulting in an adjusted textbox. For example, the user may touch a horizontal edge of the text box (312) and drag it in a vertical direction. In one direction, the box will be squeezed; in the other direction, it will be stretched. If squeezed, the spacing between lines will be uniformly decreased until it reaches the minimum value of 0. If stretched, the newly created vertical space is equally divided and inserted in the gaps between all the existing lines of handwritten text. If the user wishes to stretch/squeeze the box, then the text box dimensions are altered according to the user input, and the computer further wraps the handwritten text to fit the new stretched/squeezed dimensions of the adjusted text box, adjusting gaps between lines (Step 810) as described above in FIG. 7 for the adjusted text box as well. If the user does not wish to alter the text box, the process ends.

Figure 9:
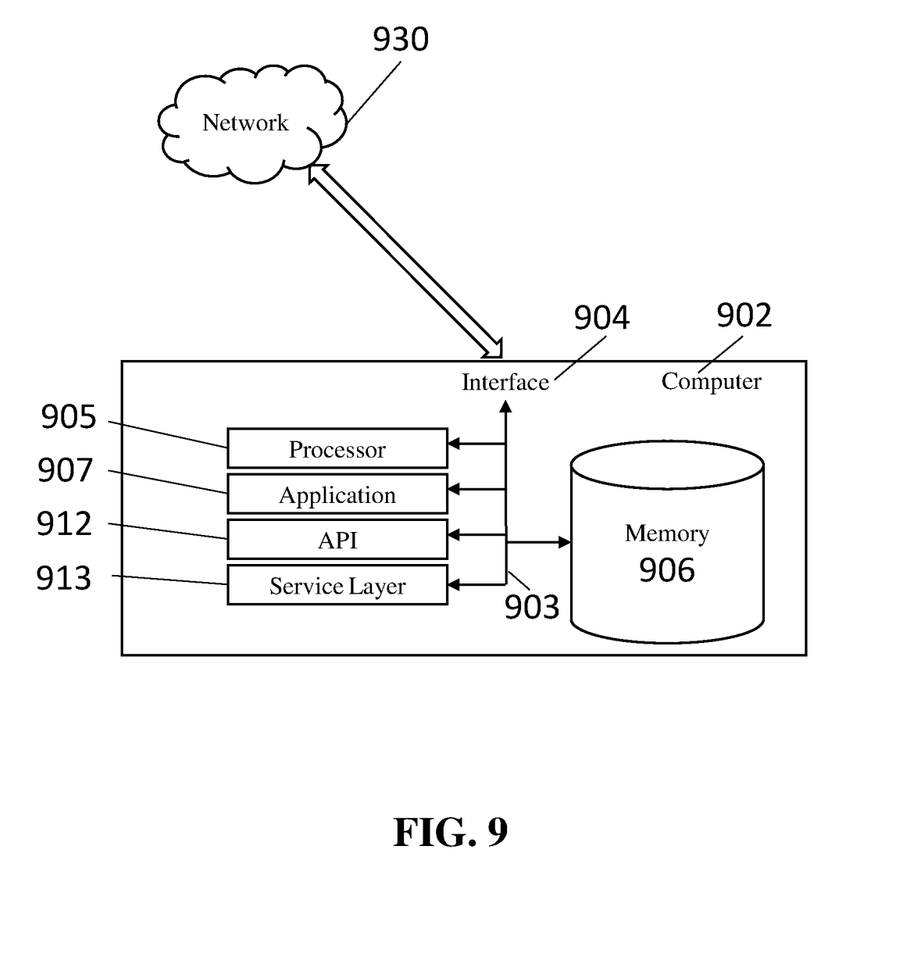
FIG. 9 depicts a computer system for implementing one or more embodiments.

FIG. 9 depicts a block diagram of a computer system (902) used to provide computational functionalities associated with described algorithms, methods, functions, processes, flows, and procedures as described herein, according to one or more embodiments. As shown, the computer (902) includes an interface (904), a computer processor (905), a memory (906), an application (907), an application programming interface (API) (912), and a service layer (913). The illustrated computer (902) is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer (902) may include an input device, such as a keypad, keyboard, touch screen, or other device that can accept user information, and an output device that conveys information associated with the operation of the computer (902), including digital data, visual, or audio information (or a combination of information), or a GUI.

The computer (902) can serve in a role as a client, network component, a server, a database or other persistency, or any other component (or a combination of roles) of a computer system for performing the subject matter described in the instant disclosure. The illustrated computer (902) is communicably coupled with a network (930). In some implementations, one or more components of the computer (902) may be configured to operate within environments, including cloud-computing-based, local, global, or other environment (or a combination of environments).

At a high level, the computer (902) is an electronic computing device operable to receive, transmit, process, store, or manage data and information associated with the described subject matter. According to some implementations, the computer (902) may also include or be communicably coupled with an application server, e-mail server, web server, caching server, streaming data server, business intelligence (BI) server, or other server (or a combination of servers).

The computer (902) can receive requests over the network (930) from a client application (for example, executing on another computer (902)) and responding to the received requests by processing the said requests in an appropriate software application. In addition, requests may also be sent to the computer (902) from internal users (for example, from a command console or by other appropriate access method), external or third-parties, other automated applications, as well as any other appropriate entities, individuals, systems, or computers.

Each of the components of the computer (902) can communicate using a system bus (903). In some implementations, any or all of the components of the computer (902), both hardware or software (or a combination of hardware and software), may interface with each other or the interface (904) (or a combination of both) over the system bus (903) using the API (912) or a service layer (913) (or a combination of the API (912) and service layer (913). The API (912) may include specifications for routines, data structures, and object classes. The API (912) may be either computer-language independent or dependent and refer to a complete interface, a single function, or even a set of APIs. The service layer (913) provides software services to the computer (902) or other components (whether or not illustrated) that are communicably coupled to the computer (902). The functionality of the computer (902) may be accessible for all service consumers using this service layer. Software services, such as those provided by the service layer (913), provide reusable, defined business functionalities through a defined interface. For example, the interface may be software written in JAVA, C++, or other suitable language providing data in extensible markup language (XML) format or another suitable format. While illustrated as an integrated component of the computer (902), alternative implementations may illustrate the API (912) or the service layer (913) as stand-alone components in relation to other components of the computer (902) or other components (whether or not illustrated) that are communicably coupled to the computer (902). Moreover, any or all parts of the API (912) or the service layer (913) may be implemented as child or submodules of another software module, enterprise application, or hardware module without departing from the scope of this disclosure.

The computer (902) includes an interface (904). Although illustrated as a single interface (904) in FIG. 9, two or more interfaces (904) may be used according to particular needs, desires, or particular implementations of the computer (902). The interface (904) is used by the computer (902) for communicating with other systems in a distributed environment that are connected to the network (930). Generally, the interface (904) includes logic encoded in software or hardware (or a combination of software and hardware) and operable to communicate with the network (930). More specifically, the interface (904) may include software supporting one or more communication protocols associated with communications such that the network (930) or interface's hardware is operable to communicate physical signals within and outside of the illustrated computer (902).

The computer (902) includes one or more computer processors (905). Although illustrated as a single computer processor (905) in FIG. 9, two or more processors may be used according to particular needs, desires, or particular implementations of the computer (902). Generally, the computer processor (905) executes instructions and manipulates data to perform the operations of the computer (902) and any algorithms, methods, functions, processes, flows, and procedures as described in the instant disclosure.

The computer (902) also includes a memory (906) that holds data for the computer (902) or other components (or a combination of both) that can be connected to the network (930). For example, memory (906) can be a database storing data consistent with this disclosure. Although illustrated as a single memory (906) in FIG. 9, two or more memories may be used according to particular needs, desires, or particular implementations of the computer (902) and the described functionality. While memory (906) is illustrated as an integral component of the computer (902), in alternative implementations, memory (906) can be external to the computer (902).

The application (907) is an algorithmic software engine providing functionality according to particular needs, desires, or particular implementations of the computer (902), particularly with respect to functionality described in this disclosure. For example, application (907) can serve as one or more components, modules, applications, etc. Further, although illustrated as a single application (907), the application (907) may be implemented as multiple applications (907) on the computer (902). In addition, although illustrated as integral to the computer (902), in alternative implementations, the application (907) can be external to the computer (902).

There may be any number of computers (902) associated with, or external to, a computer system containing the computer (902), wherein each computer (902) communicates over network (930). Further, the term "client," "user," and other appropriate terminology may be used interchangeably as appropriate without departing from the scope of this disclosure. Moreover, this disclosure contemplates that many users may use one computer (902), or that one user may use multiple computers (902).

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims.

What is claimed is:

1. A computer-implemented method for handwritten text line wrapping, comprising:
    obtaining, from a user, at least two words of handwritten text on a screen;
    creating a bounding box around each of the at least two words of handwritten text;
    creating at least one line-break character for the at least two words of handwritten text;
    determining highest and lowest points in each line of the at least two words of handwritten text, wherein a lower limit of each line is at least one baseline for the at least two words of handwritten text;
    adjusting the bounding box around each of the at least two words of handwritten text based on the at least one baseline to obtain a plurality of adjusted bounding boxes, wherein all the adjusted bounding boxes have a same height so that all the at least two words of handwritten text in a same line also have a same height;
    generating, on the screen, a text box;
    moving, on the screen, at least one of the at least two words of handwritten text from a first line of at least one line of handwritten text to a second line of the at least one line of handwritten text, wherein the second line of handwritten text fits within the text box; and
    adjusting at least one gap between the at least one line of handwritten text.

2. The method of claim 1, further comprising:
    detecting, on the screen from the user, a gesture to adjust at least one dimension of the text box;
    adjusting the at least one dimension of the text box to obtain an adjusted textbox; and
    readjusting the at least one gap between the two lines of handwritten text such that the two lines of handwritten text fit within the adjusted textbox.

3. The method of claim 1, wherein:
    a first boundary of each of the adjusted bounding boxes is determined by a minimum vertical coordinate of the bounding box around each of the at least two words of handwritten text, and
    a second boundary of each of the adjusted bounding boxes is determined by a maximum vertical coordinate of the bounding box around each of the at least two words of handwritten text.

4. The method of claim 2, wherein the at least two words of handwritten text and the gesture are entered by the user with a stylus or a finger on a touch screen.

5. The method of claim 1, wherein the at least one gap between the at least one line of handwritten text has a common gap length.

6. The method of claim 1, wherein the at least one baseline of the at least one line of handwritten text has a vertical coordinate determined by the at least two words of handwritten text.

7. The method of claim 1, wherein at least one explicit line break is preserved upon moving the at least one of the at least two words of handwritten text.

8. A non-transitory computer readable medium storing instructions executable by a computer processor, the instructions comprising functionality for:
   obtaining, from a user, at least two words of handwritten text on a screen;
   creating a bounding box around each of the at least two words of handwritten text;
   creating at least one line-break character for the at least two words of handwritten text;
   determining highest and lowest points in each line of the at least two words of handwritten text, wherein a lower limit of each line is at least one baseline for the at least two words of handwritten text;
   adjusting the bounding box around each of the at least two words of handwritten text based on the at least one baseline to obtain a plurality of adjusted bounding boxes, wherein all the adjusted bounding boxes have a same height so that all the at least two words of handwritten text in a same line also have a same height;
   generating, on the screen, a text box;
   moving, on the screen, at least one of the at least two words of handwritten text from a first line of at least one line of handwritten text to a second line of the at least one line of handwritten text; and
   adjusting at least one gap between the at least one line of handwritten text.

9. The non-transitory computer readable medium storing instructions executable by a computer processor of claim 8, the instructions further comprising functionality for:
   detecting, on the screen from the user, a gesture to adjust at least one dimension of the text box;
   adjusting the at least one dimension of the text box to obtain an adjusted textbox; and
   readjusting the at least one gap between the two lines of handwritten text such that the two lines of handwritten text fit within the adjusted textbox.

10. The non-transitory computer readable medium storing instructions executable by a computer processor of claim 8, wherein:
   a first boundary of each of the adjusted bounding box is determined by a minimum vertical coordinate of the bounding box around each of the at least two words of handwritten text, and
   a second boundary of each of the adjusted bounding box is determined by a maximum vertical coordinate of the bounding box around each of the at least two words of handwritten text.

11. The non-transitory computer readable medium storing instructions executable by a computer processor of claim 9, wherein the at least two words of handwritten text and the gesture are entered by the user with a stylus or a finger on a touch screen.

12. The non-transitory computer readable medium storing instructions executable by a computer processor of claim 8, wherein the at least one gap between the at least one line of handwritten text has a common length.

13. The non-transitory computer readable medium storing instructions executable by a computer processor of claim 8, wherein the at least one baseline of the at least one line of handwritten text has a vertical coordinate determined by the at least two words of handwritten text.

14. The non-transitory computer readable medium storing instructions executable by a computer processor of claim 8, wherein at least one line break is preserved upon moving the at least one of the at least two words of handwritten text.

15. A system comprising functionality for handwritten text line wrapping, comprising:
   a screen configured to receive input from a user and display the input to the user; and
   a computer processor, configured to:
      obtain, from the user, at least two words of handwritten text on the screen,
      create a bounding box around each of the at least two words of handwritten text,
      create at least one line-break character for the at least two words of handwritten text,
      determine highest and lowest points in each line of the at least two words of handwritten text, wherein a lower limit of each line is at least one baseline for the at least two words of handwritten text,
      adjusting the bounding box around each of the at least two words of handwritten text based on the at least one baseline to obtain a plurality of adjusted bounding boxes, wherein all the adjusted bounding boxes have a same height so that all the at least two words of handwritten text in a same line also have a same height,
      move, on the screen, at least one of the at least two words of handwritten text from a first line of at least one line of handwritten text to a second line of the at least one line of handwritten text, and
      adjust at least one gap between the at least one line of handwritten text.

16. The system of claim 15, wherein the computer processor is further configured to:
   detect, on the screen from the user, a gesture to adjust at least one dimension of the text box;
   adjust the at least one dimension of the text box to obtain an adjusted textbox; and
   readjust the at least one gap between the two lines of handwritten text such that the two lines of handwritten text fit within the adjusted textbox.

17. The system of claim 15, wherein:
   a first boundary of each of the adjusted bounding boxes is determined by a minimum vertical coordinate of the bounding box around each of the at least two words of handwritten text, and
   a second boundary of each of the adjusted bounding boxes is determined by a maximum vertical coordinate of the bounding box around each of the at least two words of handwritten text.

18. The system of claim 16, wherein the at least two words of handwritten text and the gesture are entered by the user with a stylus or a finger on a touch screen.

19. The system of claim 15, wherein the at least one gap between the at least one line of handwritten text has a common length.

20. The system of claim 15, wherein the at least one baseline of the at least one line of handwritten text has a vertical coordinate determined by the at least two words of handwritten text.

* * * * *